United States Patent Office.

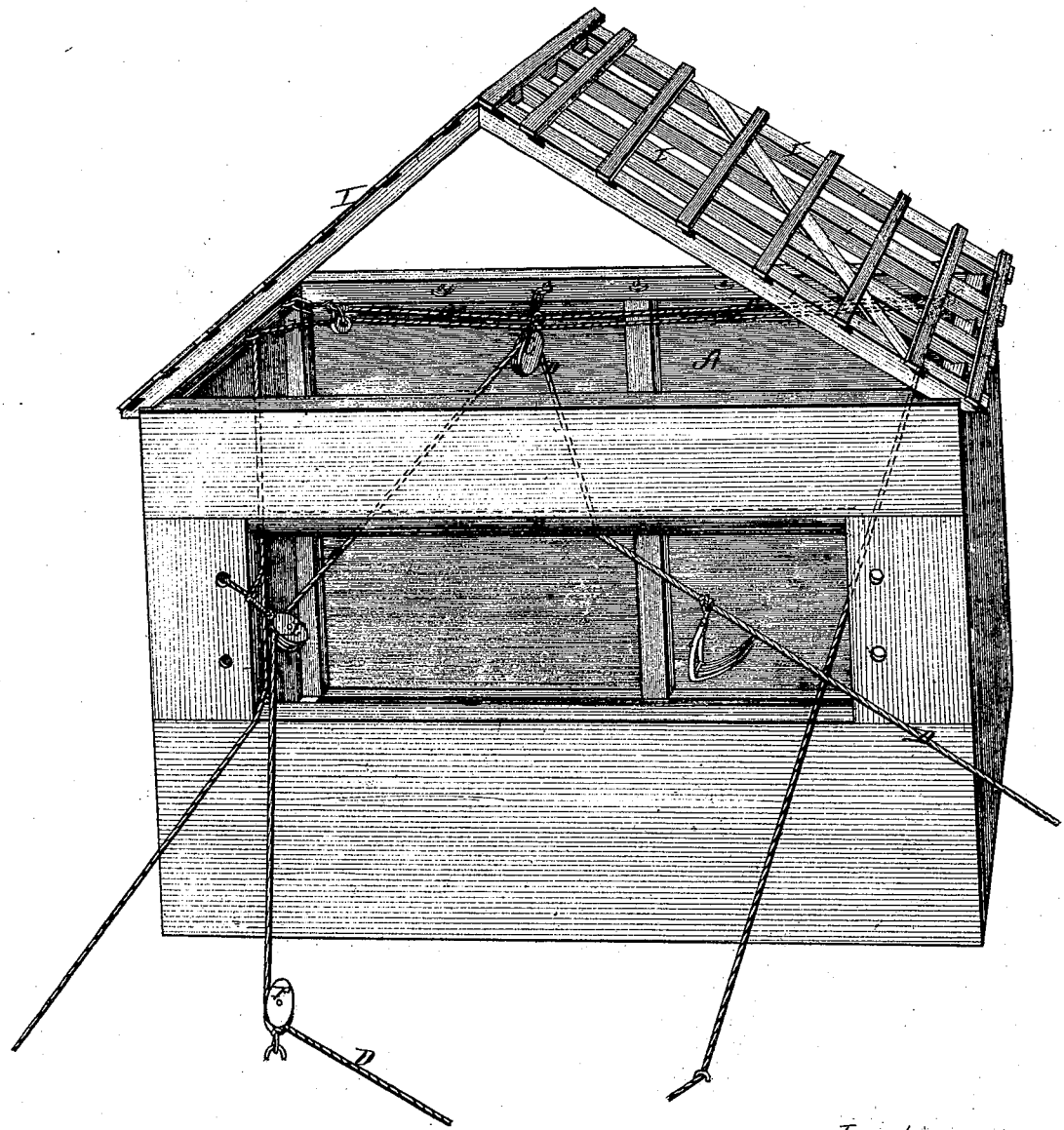

ANTHONY SMITH, OF SHELLSBURG, PENNSYLVANIA.

Letters Patent No. 95,611, dated October 5, 1869.

IMPROVEMENT IN HAY-ELEVATORS.

The Schedule referred to in these Letters Patent and making part of the same

*To all whom it may concern:*

Be it known that I, ANTHONY SMITH, of Shellsburg, in the county of Bedford, and in the State of Pennsylvania, have invented certain new and useful Improvements in Hay-Elevators; and do hereby declare that the following is a full, clear, and exact description thereof, reference being had to the accompanying drawings, and to the letters of reference marked thereon, making a part of this specification.

The nature of my invention consists in the construction and arrangement of a hay-elevator.

In order to enable others skilled in the art to which my invention appertains, to make and use the same, I will now proceed to describe its construction and operation, referring to the annexed drawing, which represents a perspective of a mow with the elevating-apparatus attached.

A represents the mow, having an opening or mow-hole of suitable size, at the upper edge of which is placed a roller, B, for the purpose of letting the rope and hay pass smoothly through the mow-hole to the top of the mow.

C represents the movable block, with a ring and hook attached, through which block the hoisting-rope D passes, said rope also passing through a block, E, at the side of the mow-hole, to steady the rope and keep it from the wagon, and also through another block, F, to keep it down to the horse-draught.

G is a rope, on which the block C slides, said block being moved, by the shifting-rope H, from side to side.

When no shifting-rope is used, the block C is hitched to staples, *a a*, along the upper edge of the mow, or it may be hitched to the rafters I I when the mow is nearly full.

The rope G may extend one-third or one-fourth across the mow, the hay filled up to it, when one end is let loose, and changed to any position desired. Thus this rope need not be as long as is usually the case, and consequently need not be so strong.

My mode of curing the hay in the mow is to place it loosely, or without tramping, in the far or back part of the mow first, piling it up along the back wall so that the air can pass through it, which will better regulate the heat and sweat and save the hay from must, than the old way of dropping in the centre of the mow, which causes a greater heat to collect in the middle where it is confined, and gradually spreads outward, spoiling the quality of the hay.

To accomplish my object with the least possible trouble, I make the rope on which the hoisting-block slides, movable, so as to be readily changed from one position to another, and place staples at suitable points in the mow to hitch the hoisting-block to.

When necessary, the hoisting-block is hooked on to the rafters to fill the mow.

Having thus fully described my invention,

What I claim as new, and desire to secure by Letters Patent, is—

The arrangement, within the mow, of the blocks C E, hoisting-rope D, guide-rope G, shifting-rope H, and staples *a a*, all substantially as shown and described.

In testimony that I claim the foregoing, I have hereunto set my hand, this 27th day of July, 1869.

ANTHONY SMITH.

Witnesses:
SAMUEL CARL,
PETER DEWALT.